United States Patent Office 2,893,063
Patented July 7, 1959

2,893,063

PROCESS OF PRODUCING COMPOSITE OR COATED ARTICLES COMPRISING FOAMED PLASTICS AND COVERING LAYERS

Peter Hoppe, Troisdorf, Germany, assignor, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Application February 2, 1955
Serial No. 485,820

Claims priority, application Germany February 9, 1954

11 Claims. (Cl. 18—60)

This invention relates to composite or coated articles comprising plastic foams and covering layers and to a process of producing same.

It is old in the art to apply synthetic resins to plastic foams for the purpose of producing composite or coated articles. However, it is exceedingly difficult to coat or lacquer such plastic foams in molded form so as to provide same with a smooth and impervious surface, particularly when such molded materials have highly irregular surfaces or complicated contours.

Therefore, it is an object of the present invention to overcome the above difficulty and provide an improved process of producing composite or coated articles comprising a plastic foam and a smooth impervious outer covering layer.

Another object of the invention is to provide an economically and commercially practical process of producing molded composite or coated articles comprising a plastic foam having highly irregular surfaces or complicated contours which are coated or covered with a smooth and impervious outer layer.

Other objects and advantages of the invention will appear hereinafter as the description proceeds.

In accordance with the present invention, composite or coated articles comprising plastic foams and covering layers are prepared by applying to a suitable surface a covering layer of the desired thickness comprising a polyester-isocyanate mixture and, if desired, a solvent or diluent and then, prior to or after cross-linking or curing such mixture, coating this layer with a polyester-isocyanate mixture which produces a plastic foam.

The covering layers may be produced by casting or spraying the polyester-isocyanate mixture into a mold. These covering layers may be reinforced by means of fabrics introduced into the mold before the addition of polyester-isocyanate mixture. As reinforcing agents for the covering layers, fibrous materials consisting of glass, synthetic resins, polyamides or wire, etc. may be employed. The fabric or fibrous materials are impregnated by the reactive polyester-isocyanate mixture and on solidification of the latter are rigidly bonded to the films constituting the covering layers.

Polyesters which are suitable for preparing the covering layers may be prepared from adipic acid and di- and/or trihydric alcohols, using such a ratio of the reactants that the resultant polyester has a hydroxyl number within the range of about 20 to about 350. Diisocyanates which may be reacted with these polyesters to form the covering layer include, inter alia, hexamethylene diisocyanate and toluylene diisocyanate.

The covering layer may be produced from a plurality of layers or coatings which have varying thicknesses. The final coating or covering layer serves only as a bonding layer and therefore can be kept quite thin. In general, the single layers will have a thickness within the range of about 0.2 mm. to about 1.5 mm.

The plastic foam applied to the covering layer may be prepared from any polyester commonly employed in the production of polyester-based foamed plastics. These polyesters are usually derived from dicarboxylic acids, such as adipic acid and phthalic acid, and di- and/or trihydric alcohols, such as ethylene glycol, diethylene glycol, butylene glycol-1,3, glycerol, trimethylol propane and hexanetriol. The diisocyanate most suitable for the reaction with these polyesters to produce plastic foams is toluylene diisocyanate, although other polyisocyanates may be used, if desired.

Depending upon the nature of the polyesters and diisocyanates used in the foaming process, either elastic or rigid foams are obtained in combination with the covering layer.

In the preparation of the covering layer, cross-linking may be effected by allowing the pretreated molds to stand in the open air for a certain period, the water vapor contained in the air acting as the cross-linking agent. Alternatively, the molds into which the polyester-isocyanate mixture has been cast or sprayed to form a covering layer, may be treated with steam to bring about cross-linking. A third option is to carry out the foaming process immediately after casting or spraying the polyester-isocyanate mixture serving to build up the covering layer into the mold, the heat and the steam evolved in the foaming process bringing about cross-linking of the initial mixture used in forming the covering layer.

For a more complete understanding of the present invention, reference is made to the following illustrative examples, in which the parts and percentages are by weight.

Example 1

Into a degreased mold there is sprayed a 20% methylene chloride solution of a composition consisting of the addition product of 100 parts of a linear adipic acid-diethylene glycol polyester (hydroxyl number: 45) and 13 parts of hexamethylene diisocyanate, and 2.5% of a mixture of peralkylated diethylene triamine and peralkylated triethylene tetramine, based on the weight of said addition product. After carrying out this operation, 100 parts of an hydroxyl polyester of adipic acid and ethylene glycol (hydroxyl number: 50), 25 parts of toluylene diisocyanate and 7 parts of an activator mixture consisting of 3 parts of the ester of 1 mol of adipic acid and 2 mols of N-diethyl ethanolamine, 2 parts of dispersing agent and 1.2 parts of water are intimately mixed and the resulting foamable composition introduced into the pretreated mold. During the ensuing foaming process, the foamed product is intimately combined with the covering layer or coating initially sprayed into the mold.

Example 2

The procedure described in Example 1 is repeated using in the initial methylene chloride spray the addition product of 100 parts of a linear adipic acid-glycol polyester and 5 parts of a triisocyanate such as triphenylmethane triisocyanate or the triisocyanate derived from 1 mol of hexanetriol and 3 mols of toluylene diisocyanate. This yields a composite article in which the covering layer is rigidly bonded to the polyurethane foam.

Example 3

The procedures described in Examples 1 and 2 are followed except that a nylon fabric is introduced after the initial spraying operation. This yields composite articles having a covering layer of substantially improved surface strength.

Example 4

The procedures described in Examples 1 and 2 are repeated using a dyestuff in the initial spray. A highly satisfactory dyeing effect is obtained in the covering layers with only 0.5–4% of dyestuff, based on the weight of the covering layer.

Example 5

The procedures described in Examples 1 and 2 are followed except that a plurality of spraying operations are carried out and each sprayed film or layer is cured or cross-linked before applying the next layer. A composite article consisting of a layer of plastic foam and a relatively thick polyurethane coating or covering layer is thereby obtained.

Example 6

The spraying operation is carried out with a 20% methylene chloride solution of a mixture consisting of 100 parts of the polyester obtained from 15.6 mols of adipic acid, 16.3 mols of diethylene glycol and 1.0 mol of trimethylol propane (hydroxyl number of said polyester: 60), and 9.2 parts of toluylene diisocyanate. In the foaming process, there are used 100 parts of a polyester mixture consisting of 50 parts of a polyester obtained from 5.1 mols of adipic acid, 1.0 mol of phthalic anhydride and 8.4 mols of hexanetriol and 50 parts of a polyester obtained from 1.43 mols of adipic acid, 1.0 mol of hexanetriol and 1.0 mol of 1,3-butanediol, 45 parts of toluylene diisocyanate, 1 part of hexahydrodimethyl-aniline and 10 parts of calcium silicate containing about 10% of water.

In carrying out the process of this invention, the polyester-isocyanate mixture, with or without a suitable dye, is diluted with methylene chloride, benzene toluene or another diluent or solvent until it can be sprayed. When the sprayable composition is introduced, it is distributed in the light metal molds which must be highly polished in order to produce molded elements with a smooth surface. For accelerating the evaporation of the solvent, it is desirable to briefly irradiate with infrared light the applied solution of the polyester-isocyanate mixture.

When separable molds are employed, the process permits the provision of a completely impervious covering layer on the foamed plastic if the surfaces of the halves of the mold which are in contact are additionally provided with a polyester-isocyanate layer after the initial polyester-isocyanate layers have been applied by spraying.

The process of the instant invention is useful for producing molded articles of all kinds such as plates, dolls, lifebelts and life buoys having smooth impervious coatings or covering layers.

What is claimed is:

1. A process of producing coated polyurethane foams which comprises forming, on a surface, a layer comprising a polyester-isocyanate mixture dissolved in an inert organic solvent therefor, evaporating substantially all of said solvent, applying to the resulting layer a foaming composition comprising a polyester-isocyanate mixture, and carrying out the foaming operation.

2. The process of claim 1 wherein said polyester-isocyanate dissolved in said solvent is cross-linked with water prior to the application of said foaming composition.

3. The process of claim 1 wherein said polyester-isocyanate dissolved in said solvent is cross-linked with water after the application of said foaming composition.

4. A process of producing coated polyurethane foams as defined in claim 1, in which the layer of the first mentioned mixture is formed by casting same in a mold.

5. A process of producing coated polyurethane foams as defined in claim 1, in which the layer of the first mentioned mixture is formed by spraying same in a mold.

6. A process of producing coated polyurethane foams as defined in claim 5, in which a fibrous reinforcing material is introduced into the mold prior to the layer of the said first mentioned mixture.

7. A process of producing coated polyurethane foams as defined in claim 1, in which the polyester-isocyanate mixture used in the preparation of said layer contains a tertiary amine as an accelerator.

8. A process of producing coated polyurethane foams as defined in claim 1, in which the polyester-isocyanate mixture used in the preparation of said layer is diluted with methylene chloride.

9. A process of producing coated polyurethane foams as defined in claim 1, in which the polyester-isocyanate mixture used in the preparation of said layer contains a dye.

10. A process of producing coated polyurethane foams as defined in claim 1, in which the first mentioned layer is formed by a plurality of applications of said polyester-isocyanate mixture.

11. In the coating of a cellular polyurethane, the improvement which comprises coating a mold with a solution of a polyurethane in a suitable inert organic solvent therefor, evaporating substantially all of said solvent, placing a foamable polyurethane reaction mixture adjacent the resulting coating and effecting foaming thereof, thereby securing the resulting cellular structure to the coating while avoiding appreciable penetration of the cellular structure by the coating.

References Cited in the file of this patent

UNITED STATES PATENTS

| | | |
|---|---|---|
| 2,285,370 | Staelin | June 2, 1942 |
| 2,639,252 | Simon et al. | May 19, 1953 |
| 2,642,920 | Simon et al. | June 23, 1953 |
| 2,706,311 | Durst et al. | Apr. 19, 1955 |
| 2,710,266 | Hochberg | June 7, 1955 |
| 2,779,689 | Reis | Jan. 29, 1957 |
| 2,781,553 | Verela | Feb. 19, 1957 |